Patented Aug. 30, 1932

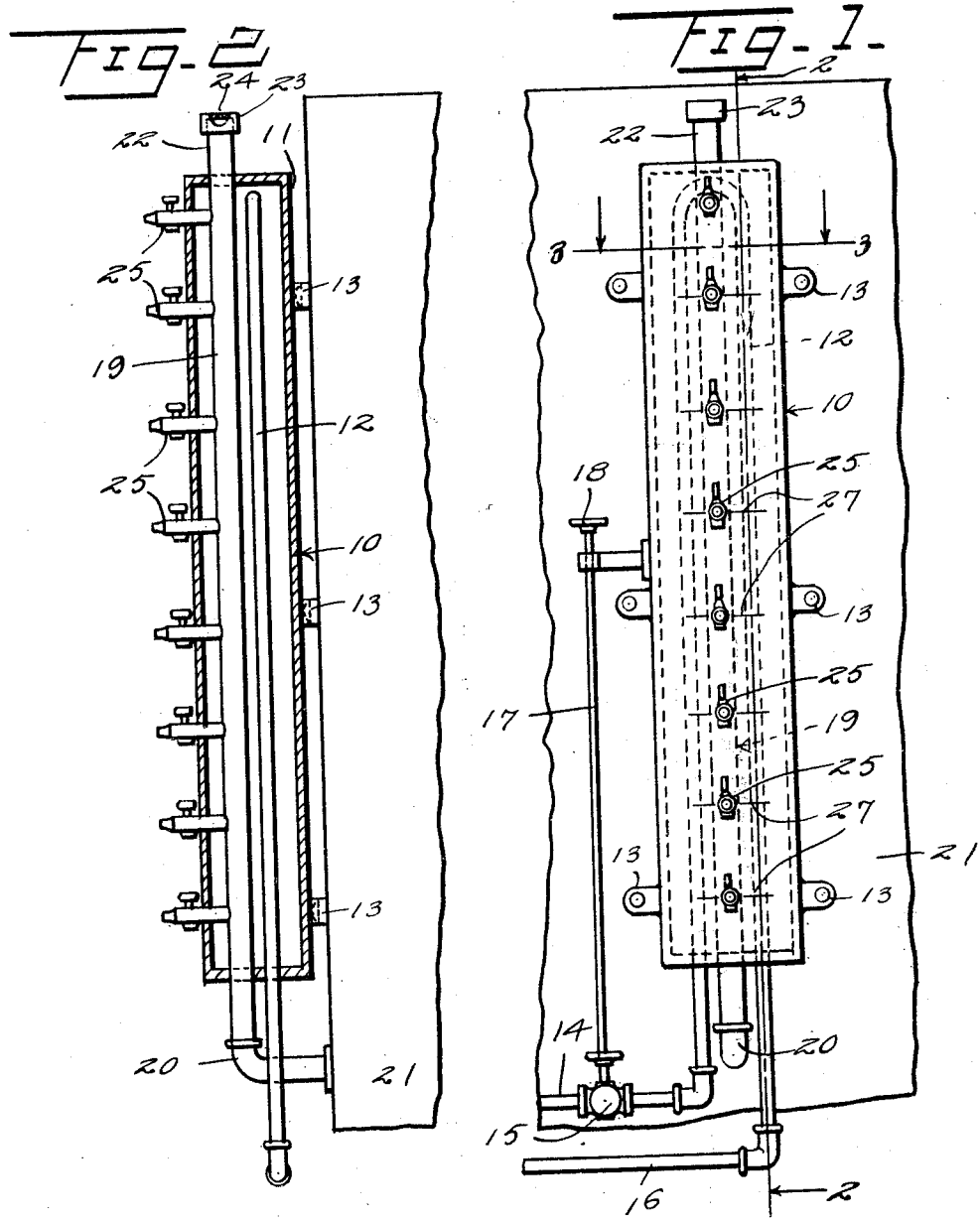
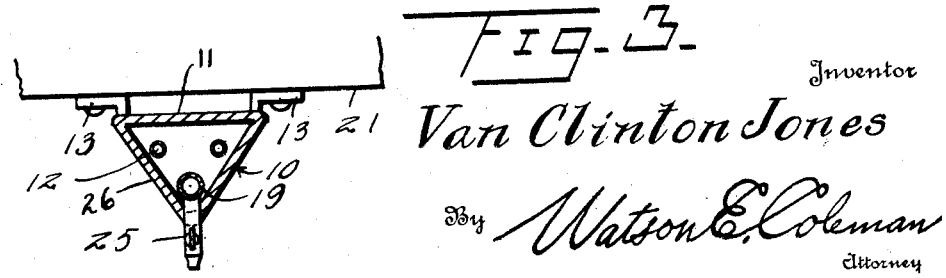

1,874,302

UNITED STATES PATENT OFFICE

VAN CLINTON JONES, OF FORT WAYNE, INDIANA

HEATED WATER GAUGE

Application filed December 30, 1930. Serial No. 505,598.

The present invention relates to water gauges or the like and more particularly to a water gauge adapted to be used on a reservoir tank or tender of a railroad engine.

An object of this invention is to provide a gauge which may be mounted at a convenient point on a tender or a locomotive so that it will not be necessary for any member of the crew to crawl over the top of the tender to observe the quantity of water within the tender through the filling opening or a gauge opening.

Another object of this invention is to provide in a device of this kind means for maintaining the gauge in a heated condition so that it will not become frozen during the winter months.

A further object of this invention is to provide a gauge pipe which is surrounded by a heating jacket, the gauge pipe being mounted at any desired convenient location and having vent means for eliminating the air within the gauge upon filling of the reservoir.

A still further object of this invention is to provide in a gauge of this kind means for determining the exact quantity of water or fluid within the tank.

The above and various other objects and advantages of this invention will in part be described in and in part be understood from the following detailed description of the present preferred embodiment, the same being illustrated in the accompanying drawing, wherein:—

Figure 1 is a detail front elevation of a device constructed according to the preferred embodiment of this invention mounted on a reservoir or tank which is shown in fragmentary form;

Figure 2 is a sectional view partly in detail taken on the line 2—2 of Figure 1, and Figure 3 is a sectional view taken on the line 3—3 of Figure 1.

Referring to the drawing wherein like numerals of reference designate corresponding parts throughout the several views, the numeral 10 designates generally a jacket for a gauge constructed according to the preferred embodiment of this invention, this jacket 10 being constructed in any desired form but in the present instance constructed in substantially triangular cross sectional form and provided at spaced points along the inner face or base 11 thereof with a plurality of attaching lugs 13 which are provided with suitable apertures for the reception of securing bolts or the like so as to permit the mounting of the jacket 10 in the desired location on the locomotive.

The jacket 10 is preferably hollow but is also closed at each end thereof and is of elongated construction and of a length substantially equal to the depth of the reservoir or tank. A heating coil 12 of substantially U-shaped construction is mounted within the jacket 10 and one end of the coil 12 is connected to a source of heating supply by means of a pipe line 14 and a valve 15 is interposed in the pipe line 14 so as to regulate the steam passing into the coil 12. The other end of the coil 12 is connected to an exhaust line 16, this exhaust line 16 being connected to any desired outlet. The source of heating supply 14 is preferably obtained from the exhaust steam of the locomotive so that it is not necessary to use live steam for the heating of the jacket 10. The valve 15 may, if desired, be provided with an elongated extension rod 17 which at the free end thereof is provided with a wheel or handle 18 so that the valve 15 may be opened or closed at a point remote therefrom. This rod 17 may be of any desired length and the handle or wheel 18 positioned at a point convenient to one of the members of the crew of the locomotive and is preferably positioned at a point closely adjacent to the cab of the locomotive.

A gauge pipe or member generally designated as 19 is mounted within the jacket 10 and extends longitudinally of the heating coil 12, the lower end 20 of the gauge member 19 being connected to the reservoir 21 at a point closely adjacent the bottom thereof. The upper end 22 of the gauge member 19 preferably extends outwardly of the upper end of the jacket 10 and a cap 23 is threadably or otherwise mounted thereon and provided with a vent opening 24 so as to permit the exhaustion of the air within the gauge member 19 when the tank 21 is filled and the water runs upwardly within the gauge member 19.

At selected points along the gauge member 19, there are provided valve members 25 which extend outwardly of the jacket 10, these valve members 25 being normally closed but may be manually opened so as to permit the water within the gauge member 19 to flow outwardly therefrom and thereby determine the level of the water within the tank or reservoir 21. In order to determine the level of the water within the tank 21, the uppermost of the valve members 25 may be opened and if the water does not flow outwardly therefrom, succeeding valve members 25 may be opened until the water flows outwardly therefrom, thereby determining the exact level of water within the reservoir 21.

It will, of course, be understood that the valves 25 are only open so as to determine whether the level of the water within the reservoir 10 is up to the opened valve and if the water flows outwardly of the valve it is immediately closed. The outer converging sides 26 of the heater jacket or casing 10 may be provided adjacent each valve or petcock with suitable indicia 27 indicating the quantity of water in gallons or the like within the tank 21 on a level with the selected valves 25.

While I have indicated the jacket 10 as being constructed in substantially triangular shape and having a U-shaped coil mounted therein, I do not wish to be limited to this construction as the jacket 10 may be constructed in any other desired shape and in like manner the coil 12 which is herein disclosed as being substantially U-shaped in form may be constructed in any other desired form or shape, this coil 12 being used only to prevent the freezing of the water within the gauge pipe or conduit 19 during the winter months. During the summer months, the valve 15 may be closed so as to cut off the supply of steam to the coil 12.

Through the use of the gauge member herein disclosed, it will not be necessary for any member of the train crew to crawl over the top of the water tender or tank and open the filling cap or closure member or the gauge opening in the top of the tank so as to determine the quantity of fluid within the reservoir 21. In a great many instances, the tenders attached to the locomotives are provided with water scoops through the use of which water is forced into the tank 21 while the locomotive is in motion and in cases of this kind, the only way at present in which the members of the crew can determine the quantity of water within the tender is to crawl over the top of the tender and open the gauge closure or the top filling cap. Through the use of the gauge herein disclosed, when a locomotive approaches an open tank which is mounted between the rails, the desired member of the valves 25 may be opened so that as the locomotive moves forwardly over the open reservoir and the water is being scooped up as soon as the water flows out of the opened petcock 25 indicating that a sufficient quantity of water has been picked up, the scoop may be lifted and the opened petcock 25 closed. In this way, the tender will not be unduly filled with water but at the same time a sufficient quantity of water will be taken on so as to provide the desired quantity of water for the boiler. Preferably, the jacket 10 is constructed of metal and if desired, suitable heat retaining means may be attached to the outer surface thereof so as to retain the heat within the jacket.

It is, of course, understood that various changes and modifications may be made in the details of construction and design of the above specifically described embodiment of this invention without departing from the spirit thereof, such changes and modifications being restricted only by the scope of the following claims.

I claim:—

1. A gauge of the character described, comprising an elongated tubular member adapted to be connected to a liquid reservoir, means for determining the level of water within the tubular member, a vent cap secured to the upper end of said tubular member, a hollow jacket surrounding said tubular member, said water level determining means extending outwardly of said jacket, and heating means disposed within the jacket for connection to a source of heating supply whereby to heat the liquid within the tubular member.

2. A gauge of the character described adapted to be connected to a reservoir and comprising an elongated tubular member, a plurality of normally closed valves connected to said tubular member, a hollow jacket surrounding said tubular member, and a heating coil disposed within the jacket.

3. A gauge of the character described adapted to be connected to a liquid reservoir, comprising an elongated tubular member connected at one end to a liquid reservoir, a plurality of longitudinally spaced manually operated valves mounted on said tubular member whereby to determine upon opening thereof the level of water within the tubular member, a vent cap secured to the upper end of said tubular member, a jacket surrounding said tubular member, means for mounting said jacket on the reservoir, a heating coil mounted within the reservoir, means for connecting the heating coil to a source of heating supply, and a remotely controlled valve interposed in said connecting means.

In testimony whereof I hereunto affix my signature.

VAN C. JONES.